United States Patent
Kaneko et al.

(10) Patent No.: US 9,620,812 B2
(45) Date of Patent: Apr. 11, 2017

(54) LITHIUM ION BATTERY

(75) Inventors: Shinako Kaneko, Kanagawa (JP); Hitoshi Ishikawa, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 330 days.

(21) Appl. No.: 13/977,842

(22) PCT Filed: Mar. 2, 2012

(86) PCT No.: PCT/JP2012/055381
§ 371 (c)(1),
(2), (4) Date: Jul. 1, 2013

(87) PCT Pub. No.: WO2012/118179
PCT Pub. Date: Sep. 7, 2012

(65) Prior Publication Data
US 2013/0295465 A1 Nov. 7, 2013

(30) Foreign Application Priority Data
Mar. 3, 2011 (JP) ................................. 2011-046774

(51) Int. Cl.
*H01M 10/056* (2010.01)
*H01M 4/13* (2010.01)
(Continued)

(52) U.S. Cl.
CPC ........... *H01M 10/056* (2013.01); *H01M 4/13* (2013.01); *H01M 10/0525* (2013.01);
(Continued)

(58) Field of Classification Search
CPC .. H01M 10/056; H01M 10/0525; H01M 4/13; H01M 10/0565; H01M 10/0567; H01M 10/0585; H01M 10/42
See application file for complete search history.

(56) References Cited

U.S. PATENT DOCUMENTS

2006/0172201 A1* 8/2006 Yasukawa et al. ........... 429/329
2008/0138715 A1* 6/2008 Ihara et al. .................... 429/338
(Continued)

FOREIGN PATENT DOCUMENTS

CN 101557019 A 10/2009
JP 08-088023 A 4/1996
(Continued)

OTHER PUBLICATIONS

JP 2008-71559MT.*
(Continued)

Primary Examiner — Alex Usyatinsky
(74) Attorney, Agent, or Firm — Sughrue Mion, PLLC

(57) ABSTRACT

There is provided a lithium ion battery having high flame retardancy and good cycle characteristics on a long-term basis. The lithium ion battery according to this exemplary embodiment is a lithium ion battery comprising a nonaqueous electrolytic solution or gel electrolyte containing a Li salt and an oxoacid ester derivative of phosphoric acid; a group of stacked electrode in which positive electrodes comprising a positive electrode layer comprising a positive electrode active material disposed on at least one surface of a positive electrode current collector, and negative electrodes comprising a negative electrode layer comprising a negative electrode active material disposed on at least one surface of a negative electrode current collector are alternately stacked via separators; and a package containing the nonaqueous electrolytic solution or gel electrolyte and the group of stacked electrode, wherein both of two electrodes A disposed on outermost sides of the group of stacked electrode, respectively, satisfy $0 \leq (Wc/Wb) \leq 0.55$ when a mass of an electrode active material contained in an electrode active material-coated layer B disposed on a group-of-stacked-electrodes side of an electrode current collector is
(Continued)

(a) Electrode A (b) Diagram of electrode A viewed from below

Wb, and a mass of an electrode active material contained in an electrode active material-coated layer C disposed on a package side of the electrode current collector is Wc.

9 Claims, 5 Drawing Sheets

(51) Int. Cl.
  *H01M 10/0565* (2010.01)
  *H01M 10/0567* (2010.01)
  *H01M 10/0585* (2010.01)
  *H01M 10/0525* (2010.01)
  *H01M 10/42* (2006.01)
  *H01M 4/02* (2006.01)

(52) U.S. Cl.
  CPC ... *H01M 10/0565* (2013.01); *H01M 10/0567* (2013.01); *H01M 10/0585* (2013.01); *H01M 10/4235* (2013.01); *H01M 2004/021* (2013.01)

(56) References Cited

U.S. PATENT DOCUMENTS

| | | | |
|---|---|---|---|
| 2008/0153005 | A1* | 6/2008 | Horikawa ........... H01M 10/052 429/314 |
| 2009/0253049 | A1 | 10/2009 | Ishikawa et al. |
| 2009/0325065 | A1* | 12/2009 | Fujii et al. .................... 429/199 |
| 2010/0136411 | A1 | 6/2010 | Yoon et al. |
| 2012/0301795 | A1* | 11/2012 | Kaneko ................. H01G 9/038 429/303 |

FOREIGN PATENT DOCUMENTS

| | | |
|---|---|---|
| JP | 08-111238 A | 4/1996 |
| JP | 08-162164 A | 6/1996 |
| JP | 10-154528 A | 6/1998 |
| JP | 10-255839 A | 9/1998 |
| JP | 2002-141110 A | 5/2002 |
| JP | 2003-238821 A | 8/2003 |
| JP | 2006-286277 A | 10/2006 |
| JP | 2007-059192 A | 3/2007 |
| JP | 2007-115583 A | 5/2007 |
| JP | 2007-258067 A | 10/2007 |
| JP | 2008-021560 A | 1/2008 |
| JP | 2008-71559 * | 3/2008 |
| JP | 2008-071559 A | 3/2008 |
| JP | 2008-112722 A | 5/2008 |
| JP | 2009-129747 A | 6/2009 |
| WO | 2011/099580 A1 | 8/2011 |

OTHER PUBLICATIONS

Decision to grant Patent SIPO for Application #201280011441.0.*
Communication dated Aug. 1, 2014, issued by the European Patent Office in counterpart Application No. 12752904.8.
Communication dated Feb. 25, 2015 from the State Intellectual Property Office of the People's Republic of China in counterpart application No. 201280011441.0.
International Search Report for PCT/JP2012/055381, dated May 29, 2012.

* cited by examiner

1 Positive Electrode

5　Negative Electrode (a) Electrode A (b) Diagram of electrode A viewed from below (a) Electrode A (b) Diagram of electrode A viewed from below

LITHIUM ION BATTERY

CROSS REFERENCE TO RELATED APPLICATIONS

This application is a National Stage of International Application No. PCT/JP2012/055381 filed Mar. 2, 2012, claiming priority based on Japanese Patent Application No. 2011-046774 filed Mar. 3, 2011, the contents of all of which are incorporated herein by reference in their entirety.

TECHNICAL FIELD

This exemplary embodiment relates to a lithium ion battery.

BACKGROUND ART

Lithium ion secondary batteries or lithium secondary batteries can achieve high energy density, and therefore attract attention as power supplies for cellular phones and notebook computers and large-sized power supplies for power storage and power supplies for automobiles.

Lithium ion secondary batteries or lithium secondary batteries can achieve high energy density, but when they are large-sized, the energy density is enormous, and therefore, higher safety is required. For example, in applications for large-sized power supplies for power storage and power supplies for automobiles, particularly high safety is required. In these applications, safety is ensured by improving the structural design of cells, packages, and the like, disposing protection circuits, selecting electrode materials, additives with an overcharge-preventing function, and the like, strengthening the shutdown function of separators, and the like.

On the other hand, in lithium ion secondary batteries, usually, aprotic solvents, such as cyclic carbonates and chain carbonates, are used as electrolytic solution solvents. These carbonates have a high dielectric constant and high ionic conductivity of lithium ions, but have a low flash point and are flammable.

Therefore, a technique using, as an additive added to an electrolytic solution, a substance that reductively decomposes at a higher potential than carbonates used as electrolytic solution solvents and produces an SEI (Solid Electrolyte Interface), which is a protective film with high lithium ion permeability, is known. This SEI can improve charge and discharge efficiency, cycle characteristics, and safety. In addition, the irreversible capacity of carbon materials and oxide materials can be reduced by the SEI.

In addition, one example of a method for further increasing the safety of a lithium ion secondary battery includes making an electrolytic solution flame-retardant. Patent Literature 1 discloses an organic electrolytic solution secondary battery using a phosphate triester as the main solvent of an organic electrolytic solution, and using a carbon material for a negative electrode. Patent Literature 2 discloses that safety can be improved by using a phosphate triester as the organic solvent of an electrolytic solution.

Patent Literature 3 discloses a nonaqueous electrolyte secondary battery including a positive electrode capable of being charged and discharged, a nonaqueous electrolyte containing a lithium salt, and a negative electrode capable of being charged and discharged, wherein the above nonaqueous electrolyte contains at least one selected from the group consisting of a phosphate ester, a halogen-containing substituted phosphate ester, and a condensed phosphate ester. Patent Literature 4 discloses that an electrolytic solution with low viscosity and excellent low temperature characteristics is obtained by using a mixed solvent of a particular halogen-substituted phosphate ester compound and a particular ester compound as an electrolytic solution solvent. Patent Literature 5 discloses a method for manufacturing a nonaqueous electrolyte battery in which a nonaqueous electrolyte battery is manufactured using a nonaqueous electrolyte obtained by adding vinylene carbonate and 1,3-propane sultone. Patent Literature 6 discloses that the nonaqueous electrolyte of a nonaqueous electrolyte battery contains 5% by mass or more of phosphate esters having at least one fluorine atom in the molecular chain based on the total mass of the nonaqueous electrolyte, and has an electrolyte salt concentration of 1 mol/L or more and a viscosity at 20° C. of less than 6.4 mPa·s. It is disclosed that the nonaqueous electrolyte battery includes a nonaqueous electrolyte with flame retardancy or self-extinguishing properties, and has good charge and discharge characteristics.

Patent Literature 7 discloses an electrolytic solution for a nonaqueous battery, including a particular phosphate ester derivative, a nonaqueous solvent, and a solute. Patent Literature 8 discloses that an electrolytic solution that is excellent in conductivity and reduction resistance, and exhibits high flame retardancy even in a small amount of blending is obtained by using a fluorophosphate ester compound for a nonaqueous electrolytic solution for a battery.

Patent Literature 9 discloses that when an electrolytic solution contains a solvent containing halogenated ethylene carbonate and at least one phosphorus-containing compound selected from the group consisting of a phosphate ester, a phosphate ester, and a phosphazene compound, chemical stability can be improved also at high temperature. Patent Literature 10 discloses a nonaqueous electrolytic solution obtained by dissolving a lithium salt in a nonaqueous solvent containing a phosphate ester compound, a cyclic carbonate containing a halogen, and a chain carbonate. Patent Literature 11 discloses that a nonaqueous electrolytic solution containing an organic solvent containing 0.5 to 30% by volume of a fluorine-containing phosphate ester and an electrolyte salt is nonflammable and flame retardant, and therefore is useful as an electrolytic solution for a lithium secondary battery. In addition, it is disclosed that the solubility of the electrolyte salt is high, and when the nonaqueous electrolyte solution is used for a battery, the discharge capacity is large, and the charge and discharge cycle characteristics are excellent.

CITATION LIST

Patent Literature

Patent Literature 1: JP8-111238A
Patent Literature 2: JP8-162164A
Patent Literature 3: JP10-255839A
Patent Literature 4: JP8-88023A
Patent Literature 5: JP2007-59192A
Patent Literature 6: JP2007-258067A
Patent Literature 7: JP2002-141110A
Patent Literature 8: JP2006-286277A
Patent Literature 9: JP2007-115583A
Patent Literature 10: JP10-154528A
Patent Literature 11: JP2008-21560A

SUMMARY OF INVENTION

Technical Problem

However, in Patent Literatures 1 and 2, during long-term use, the phosphate ester is reductively decomposed on the carbon negative electrode, an increase in resistance due to the deposition of the reduced product on the electrode, an increase in resistance due to gas production, and the like occur, and the battery characteristics may decrease greatly. Further, a problem is that during use, the phosphate ester is reductively decomposed, and the flame retardancy of the electrolytic solution decreases.

Patent Literatures 3 to 8 describe the combustibility of the electrolytic solution or the initial characteristics of the battery, but do not mention the long-term reliability of the battery. Further, problems are that the halogen-substituted phosphate esters and derivatives thereof are also gradually reductively decomposed on the negative electrode during long-term use, and a decrease in battery characteristics due to an increase in resistance may occur, and as a result of the reductive decomposition, the flame retardancy of the electrolytic solution also decreases. Particularly, even in the case of addition of vinylene carbonate or 1,3-propane sultone, which are general additives for SEI formation, shown in Patent Literature 5, there is a problem that sufficient life is not attained. These literatures do not mention the flame retardancy of the battery over a long period.

Patent Literatures 9 to 11 disclose that a film containing a halogen can be formed on the negative electrode with a halogen-substituted cyclic carbonate, and the reductive decomposition of a phosphate ester or halogen-substituted phosphate ester can be suppressed. However, a problem is that when an attempt is made to suppress the reductive decomposition of the phosphate ester or halogen-substituted phosphate ester on a long-term basis only with the halogen-substituted cyclic carbonate, a large amount of the halogen-substituted carbonate is necessary, causing a decrease in the ion conductivity of the electrolytic solution. A further problem is that a substantial increase in the resistance of and a substantial decrease in the capacity retention rate of the battery are caused on a long-term basis.

It is an object of this exemplary embodiment to provide a lithium ion battery including a nonaqueous electrolytic solution or gel electrolyte containing at least an oxoacid ester derivative of phosphoric acid, the lithium ion battery having high flame retardancy and good cycle characteristics on a long-term basis.

Solution to Problem

A lithium ion battery according to this exemplary embodiment is a lithium ion battery including a nonaqueous electrolytic solution or gel electrolyte containing at least a Li salt and at least one of oxoacid ester derivatives of phosphoric acid represented by the following formulas (1) to (3); a group of stacked electrode in which positive electrodes including a positive electrode layer containing a positive electrode active material disposed on at least one surface of a positive electrode current collector, and negative electrodes including a negative electrode layer containing a negative electrode active material disposed on at least one surface of a negative electrode current collector are alternately stacked via separators; and a package containing the nonaqueous electrolytic solution or the gel electrolyte and the group of stacked electrode, wherein both of two electrodes A disposed on outermost sides of the group of stacked electrode, respectively, satisfy $0 \leq (Wc/Wb) \leq 0.55$ when a mass of an electrode active material contained in an electrode active material-coated layer B disposed on a group-of-stacked-electrodes side of an electrode current collector is Wb (g), and a mass of an electrode active material contained in an electrode active material-coated layer C disposed on a package side of the electrode current collector is Wc (g),

[Formula 1]

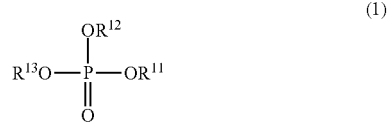

(1)

wherein $R^{11}$, $R^{12}$, and $R^{13}$ may be the same or different, and each represents an alkyl group, an aryl group, an alkenyl group, a cyano group, an amino group, a nitro group, an alkoxy group, a cycloalkyl group, or a halogen-substituted group thereof; and two groups or all groups of $R^{11}$, $R^{12}$, and $R^{13}$ may be bonded to each other to form a cyclic structure,

[Formula 2]

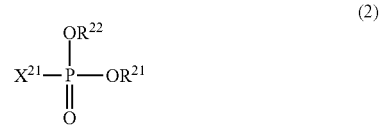

(2)

wherein $R^{21}$ and $R^{22}$ may be the same or different, and each represents an alkyl group, an aryl group, an alkenyl group, a cyano group, an amino group, a nitro group, an alkoxy group, a cycloalkyl group, or a halogen-substituted group thereof; $R^{21}$ and $R^{22}$ may be bonded to each other to form a cyclic structure; and $X^{21}$ represents a halogen element,

[Formula 3]

(3)

wherein $R^{31}$ represents an alkyl group, an aryl group, an alkenyl group, a cyano group, an amino group, a nitro group, an alkoxy group, a cycloalkyl group, or a halogen-substituted group thereof; and $X^{31}$ and $X^{32}$ may be the same or different, and each represents a halogen element.

Advantageous Effect of Invention

This exemplary embodiment can provide a lithium ion battery including a nonaqueous electrolytic solution or gel electrolyte containing at least an oxoacid ester derivative of phosphoric acid, the lithium ion battery having high flame retardancy and good cycle characteristics on a long-term basis.

DESCRIPTION OF EMBODIMENTS

Figure 1:
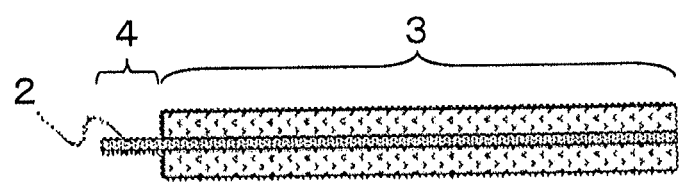
FIG. 1 is a cross-sectional view for explaining the configuration of a positive electrode according to this exemplary embodiment.

The lithium ion battery according to this exemplary embodiment is a lithium ion battery including a nonaqueous electrolytic solution or gel electrolyte containing at least a Li salt and at least one of oxoacid ester derivatives of phosphoric acid represented by the following formulas (1) to (3); a group of stacked electrode in which positive electrodes including a positive electrode layer including a positive electrode active material disposed on at least one surface of a positive electrode current collector, and negative electrodes including a negative electrode layer including a negative electrode active material disposed on at least one surface of a negative electrode current collector are alternately stacked via separators; and a package containing the above nonaqueous electrolytic solution or the above gel electrolyte and the above group of stacked electrode, wherein both of two electrodes A disposed on the outermost sides of the group of stacked electrode, respectively, satisfy $0 \leq (Wc/Wb) \leq 0.55$ when the mass of an electrode active material contained in an electrode active material-coated layer B disposed on the group-of-stacked-electrodes side of an electrode current collector is Wb (g), and the mass of an electrode active material contained in an electrode active material-coated layer C disposed on the package side of the electrode current collector is Wc (g).

In the above formula (1), $R^{11}$, $R^{12}$, and $R^{13}$ may be the same or different, and each represents an alkyl group, an aryl group, an alkenyl group, a cyano group, an amino group, a nitro group, an alkoxy group, a cycloalkyl group, or a halogen-substituted group thereof; and two groups or all groups of $R^{11}$, $R^{12}$, and $R^{13}$ may be bonded to each other to form a cyclic structure.

In the above formula (2), $R^{21}$ and $R^{22}$ may be the same or different, and each represents an alkyl group, an aryl group, an alkenyl group, a cyano group, an amino group, a nitro group, an alkoxy group, a cycloalkyl group, or a halogen-substituted group thereof; $R^{21}$ and $R^{22}$ may be bonded to each other to form a cyclic structure; and $X^{21}$ represents a halogen element.

In the above formula (3), $R^{31}$ represents an alkyl group, an aryl group, an alkenyl group, a cyano group, an amino group, a nitro group, an alkoxy group, a cycloalkyl group, or a halogen-substituted group thereof; and $X^{31}$ and $X^{32}$ may be the same or different, and each represents a halogen element.

In the above Patent Literatures 1 to 11, there is no description regarding a cell structure when an oxoacid ester derivative of phosphoric acid is used, and no sufficient study is made on a cell structure and characteristics. Therefore, a problem is that when the electrodes form a stack structure, the decrease in cell characteristics is significant. As a result of detailed research of the inventors, it has been found that with an oxoacid ester derivative of phosphoric acid, the flame retardancy of the electrolytic solution is high, but the cell characteristics decreases significantly when the electrodes form a stack structure, and the electrode active materials not contributing to charge and discharge are present in large amounts in the outermost layers.

In other words, in this exemplary embodiment, both of the two electrodes A disposed on the outermost sides of the group of stacked electrode, respectively, satisfy $0 \leq (Wc/Wb) \leq 0.55$ when the mass of the electrode active material contained in the electrode active material-coated layer B disposed on the group-of-stacked-electrodes side of the electrode current collector is Wb (g), and the mass of the electrode active material contained in the electrode active material-coated layer C disposed on the package side of the electrode current collector is Wc (g). Thus, the decomposition of the oxoacid ester derivative of phosphoric acid on the electrode active materials disposed in the outermost layers is suppressed, and the influence of by-products produced by the decomposition is reduced, and thus, good flame retardancy and cycle characteristics can be provided over a long period. Further, by decreasing the amounts of the electrode active materials disposed in the outermost layers, not involved in charge and discharge, a reduction in cost by a reduction in the amounts of the electrode active materials and the amount of the electrolytic solution, and an improvement in volume efficiency can be achieved. The details of this exemplary embodiment will be described below.

[Nonaqueous Electrolytic Solution and Gel Electrolyte]
(Oxoacid Ester Derivative of Phosphoric Acid)

The nonaqueous electrolytic solution and gel electrolyte according to this exemplary embodiment contain at least one of the oxoacid ester derivatives of phosphoric acid represented by the above formulas (1) to (3).

Specific examples of the oxoacid ester derivatives of phosphoric acid represented by the above formula (1) include trimethyl phosphate, triethyl phosphate, tributyl phosphate, triphenyl phosphate, dimethyl ethyl phosphate, dimethyl propyl phosphate, dimethyl butyl phosphate, diethyl methyl phosphate, dipropyl methyl phosphate, dibutyl methyl phosphate, methyl ethyl propyl phosphate, methyl ethyl butyl phosphate, and methyl propyl butyl phosphate. In addition, examples of halogen-substituted oxoacid ester derivatives of phosphoric acid include tri (trifluoroethyl) phosphate, methyl (ditrifluoroethyl) phosphate, dimethyl (trifluoroethyl) phosphate, ethyl (ditrifluoroethyl) phosphate, diethyl (trifluoroethyl) phosphate, propyl (ditrifluoroethyl) phosphate, dipropyl (trifluoroethyl) phosphate, tri(pentafluoropropyl) phosphate, methyl (dipentafluoropropyl) phosphate, dimethyl (pentafluoropropyl) phosphate, ethyl (dipentafluoropropyl) phosphate, diethyl (pentafluoropropyl) phosphate, butyl (dipentafluoropropyl) phosphate, dibutyl (pentafluoropropyl) phosphate, methyl di(trifluoroethyl) phosphate, and trifluoropropyl di(trifluoroethyl) phosphate. However, the oxoacid ester derivatives of phosphoric acid represented by the above formula (1) are not limited to these.

Specific examples of the oxoacid ester derivatives of phosphoric acid represented by the above formula (2) include dimethyl fluorophosphonate, diethyl fluorophosphonate, dibutyl fluorophosphonate, diphenyl fluorophosphonate, methyl ethyl fluorophosphonate, methyl propyl fluorophosphonate, methyl butyl fluorophosphonate, ethyl methyl fluorophosphonate, propyl methyl fluorophosphonate, butyl methyl fluorophosphonate, ethyl propyl fluorophosphonate, ethyl butyl fluorophosphonate, propyl butyl fluorophosphonate, di(trifluoroethyl) fluorophosphonate, methyl trifluoroethyl fluorophosphonate, ethyl trifluoroethyl fluorophosphonate, propyl trifluoroethyl fluorophosphonate, di(pentafluoropropyl) fluorophosphonate, methyl pentafluoropropyl fluorophosphonate, ethyl pentafluoropropyl fluorophosphonate, butyl pentafluoropropyl fluorophosphonate, difluorophenyl fluorophosphonate, ethyl fluorophenyl fluorophosphonate, methyl fluoroethyl fluorophosphonate, and fluoroethyl fluoropropyl fluorophosphonate. However, the oxoacid ester derivatives of phosphoric acid represented by the above formula (2) are not limited to these.

Specific examples of the oxoacid ester derivatives of phosphoric acid represented by the above formula (3) include methyl difluorophosphinate, ethyl difluorophosphinate, butyl difluorophosphinate, phenyl difluorophosphinate, propyl difluorophosphinate, trifluoroethyl difluorophosphinate, fluoropropyl difluorophosphinate, and fluorophenyl difluorophosphinate. However, the oxoacid ester derivatives of phosphoric acid represented by the above formula (3) are not limited to these.

One of these oxoacid ester derivatives of phosphoric acid represented by the formulas may be used, or two or more of these oxoacid ester derivatives of phosphoric acid may be used in combination.

The content of the above oxoacid ester derivative of phosphoric acid is preferably 5 to 60% by mass, more preferably 10 to 40% by mass, based on the entire nonaqueous electrolytic solution or gel electrolyte. When the content of the oxoacid ester derivative of phosphorus is 5% by mass or more based on the nonaqueous electrolytic solution or gel electrolyte, its combustion suppression effect on the electrolytic solution can be more effectively provided. When the content of the oxoacid ester derivative of phosphorus is 10% by mass or more, the combustion suppression effect increases further. In addition, when the content of the oxoacid ester derivative of phosphorus is 60% by mass or less, the battery characteristics are improved by the suppression of an increase in resistance. Further, it is easy to more effectively attain a reductive decomposition suppression effect when a disulfonate ester is added, and it is easy to ensure the combustion suppression effect over a long period.

(Li Salt)

Examples of the Li salt according to this exemplary embodiment include $LiPF_6$, $LiBF_4$, $LiAsF_6$, $LiSbF_6$, $LiClO_4$, $LiAlCl_4$, $LiN(C_nF_{2n+1}SO_2)(C_mF_{2m+1}SO_2)$ (n and m are natural numbers), and $LiCF_3SO_3$. However, the Li salt is not limited to these. One of these Li salts may be used, or two or more of these Li salts may be used in combination.

(Aprotic Solvent)

For the nonaqueous electrolytic solution according to this exemplary embodiment, a solution obtained by dissolving the above Li salt and the above oxoacid ester derivative of phosphoric acid in an aprotic solvent can be used. Examples of the aprotic solvent include cyclic carbonates, such as propylene carbonate (PC), ethylene carbonate (EC), butylene carbonate (BC), and vinylene carbonate (VC), and fluorides thereof, chain carbonates, such as dimethyl carbonate (DMC), diethyl carbonate (DEC), ethyl methyl carbonate (EMC), and dipropyl carbonate (DPC), and fluorides thereof, aliphatic carboxylates, such as methyl formate, methyl acetate, and ethyl propionate, γ-lactones, such as γ-butyrolactone, chain ethers, such as 1,2-diethoxyethane (DEE) and ethoxymethoxyethane (EME), cyclic ethers, such as tetrahydrofuran and 2-methyltetrahydrofuran, dimethyl sulfoxide, 1,3-dioxolane, formamide, acetamide, dimethylformamide, dioxolane, acetonitrile, propylnitrile, nitromethane, ethyl monoglyme, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, anisole, N-methylpyrrolidone, and fluorinated carboxylates. One of these aprotic solvents can be used, or two or more of these aprotic solvents can be mixed and used. The aprotic solvent is not limited to these.

(Polymer Component)

For the gel electrolyte according to this exemplary embodiment, one obtained by gelling the above nonaqueous electrolytic solution by containing a polymer component can be used. Examples of the polymer component include monomers, oligomers, or copolymerization oligomers having two or more thermally polymerizable groups per one molecule. Specific examples thereof include bifunctional acrylates, such as ethylene glycol diacrylate, diethylene glycol diacrylate, triethylene glycol diacrylate, tetraethylene glycol diacrylate, propylene diacrylate, dipropylene diacrylate, tripropylene diacrylate, 1,3-butanediol diacrylate, 1,4-butanediol diacrylate, and 1,6-hexanediol diacrylate, trifunctional acrylates, such as trimethylolpropane triacrylate and pentaerythritol triacrylate, and tetrafunctional acrylates, such as ditrimethylolpropane tetraacrylate and pentaerythritol tetraacrylate, all of which form acrylic polymers, and the above methacrylate monomers, and, in addition to these, monomers such as urethane acrylate and urethane methacrylate, copolymerized oligomers thereof, and copolymerized oligomers of acrylonitrile. In addition, polymers that can be dissolved and gelled in plasticizers, such as polyvinylidene fluoride, polyethylene oxide, and polyacrylonitrile, can also be used.

The polymer component is not limited to the above monomers, oligomers, or polymers, and those capable of gelling can be used. In addition, for gelling, the gelling component is not limited to one type of monomer, oligomer, or polymer, and two to several gelling components can be mixed and used as required. Further, benzoins, peroxides, and the like can also be used as a thermal polymerization initiator as required. However, the thermal polymerization initiator is not limited to these.

(Disulfonate Ester)

The nonaqueous electrolytic solution and gel electrolyte according to this exemplary embodiment preferably further contain at least one of disulfonate esters represented by the following formulas (4) and (5):

[Formula 4]

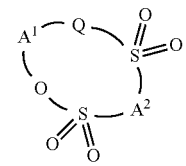

(4)

wherein Q represents an oxygen atom, a methylene group, or a single bond; $A^1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A^2$ represents a substituted or unsubstituted alkylene group, a substituted or unsubstituted fluoroalkylene group, or an oxygen atom,

[Formula 5]

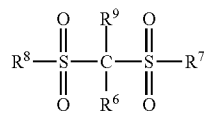

(5)

wherein $R^6$ and $R^9$ each independently represent an atom or group selected from the group consisting of a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X_3$ ($X_3$ is a substituted or unsubstituted alkyl group having 1 to 5 carbon atoms), $-SY_1$ ($Y_1$ is a substituted or unsubstituted alkyl group having 1 to 5 carbon atoms), $-COZ$ ($Z$ is a hydrogen atom or a substituted or unsubstituted alkyl group having 1 to 5 carbon atoms), and a halogen atom; and $R^7$ and $R^8$ each independently represent an atom or group selected from the group consisting of a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $-NX_4X_5$ ($X_4$ and $X_5$ are each independently a hydrogen atom or a substituted or unsubstituted alkyl group having 1 to 5 carbon atoms), and $-NY_2CONY_3Y_4$ ($Y_2$ to $Y_4$ are each independently a hydrogen atom or a substituted or unsubstituted alkyl group having 1 to 5 carbon atoms).

Specific examples of the disulfonate esters represented by the above formula (4) are shown in Table 1, and specific examples of the disulfonate esters represented by the above formula (5) are shown in Table 2. The disulfonate esters according to this exemplary embodiment are not limited to these.

TABLE 1

| Compound No. | Chemical structure |
|---|---|
| 1 | [cyclic disulfonate structure] |
| 2 | [cyclic disulfonate with $(CH_2)_2$] |
| 3 | [cyclic disulfonate with $(CH_2)_3$] |
| 4 | [cyclic disulfonate with $CH_3$/CH substituent and $(CH_2)_2$] |
| 5 | [cyclic disulfonate with gem-dimethyl] |
| 6 | [cyclic disulfonate with gem-F,F] |
| 7 | [cyclic disulfonate with gem-dimethyl on other carbon] |
| 8 | [cyclic disulfonate with two gem-dimethyl groups] |
| 9 | [cyclic disulfonate with carbonate linkage] |
| 10 | [cyclic disulfonate with gem-dimethyl and carbonate linkage] |
| 11 | [cyclic disulfonate with gem-F,F and carbonate linkage] |
| 12 | [cyclic disulfonate with sulfite linkage] |

TABLE 1-continued

| Compound No. | Chemical structure |
|---|---|
| 13 | [structure: 6-membered ring with two SO2 groups, one SO group, and C(CH3)(CH3)] |
| 14 | [structure: 6-membered ring with two SO2 groups, one SO group, and CF2] |
| 15 | [structure: 6-membered ring with two SO2 groups bridged by CH2, and O-CF2-O] |
| 16 | [structure: 7-membered ring with two SO2 groups bridged by CH2, and O-(CF2)2-O] |
| 17 | [structure: 7-membered ring with two SO2 groups, CH2 bridge, and CH2-CF2 chain] |
| 18 | [structure: 8-membered ring with two SO2 groups, CH2 bridge, H2C-O-CH2-O] |
| 19 | [structure: 8-membered ring with two SO2 groups, CH2 bridge, F2C-O-CF2-O] |
| 20 | [structure: 8-membered ring with two SO2 groups, CH2 bridge, H2C-O-CF2-O] |
| 21 | [structure: 6-membered ring with two SO2 groups, O bridge, CH2-CH2] |
| 22 | [structure: 5-membered ring with two SO2 groups, O bridge, CH2] |

TABLE 2

| Compound No. | Chemical structure |
|---|---|
| 101 | CH2(SO2-OCH3)2 |
| 102 | CH2(SO2-OCH2CH3)(SO2-OCH2CH3) |
| 103 | CH2(SO2-OCH(CH3)2)(SO2-OCH(CH3)2) |
| 104 | CH(CH3)(SO2-OCH3)(SO2-OCH3) |
| 105 | C(CH3)2(SO2-OCH3)(SO2-OCH3) |
| 106 | CH2(SO2-CH3)(SO2-OCH2CH2CH3) |
| 107 | CH2(SO2-CH3)(SO2-OCH2CH2Cl) |
| 108 | CH(OCH3)(SO2-OCH3)(SO2-OCH3) |

TABLE 2-continued

| Compound No. | Chemical structure |
|---|---|
| 109 | CF$_2$ bridging two SO$_2$-OCH$_3$ groups |
| 110 | CH$_2$ bridging SO$_2$-OH and SO$_2$-OCH$_3$ |
| 111 | CH$_2$ bridging SO$_2$-Cl and SO$_2$-OCH$_2$CH$_2$OH |
| 112 | CH$_2$ bridging SO$_2$-Cl and SO$_2$-OCH$_2$CH$_2$OSCH$_2$SCl (with S=O groups) |
| 113 | CH$_2$ bridging two SO$_2$-OCF$_2$CF$_3$ groups |
| 114 | CH$_2$ bridging two SO$_2$-NH$_2$ groups |
| 115 | CH$_2$ bridging SO$_2$-NH$_2$ and SO$_2$-OC$_6$H$_5$ |
| 116 | CH$_2$ bridging two SO$_2$-OC$_6$H$_5$ groups |
| 117 | CH$_2$ bridging two SO$_2$-NHCONH$_2$ groups |
| 118 | O=CH- bridging two SO$_2$-OH groups |
| 119 | CH$_3$-SO$_2$-CH bridging two SO$_2$-OC$_6$H$_5$ groups |
| 120 | CH$_3$CH$_2$-S-CH bridging two SO$_2$-OC$_6$H$_5$ groups |

The disulfonate esters represented by the above formula (4) and the above formula (5) can be manufactured, for example, by a method disclosed in JP5-44946A.

The proportion of at least one of the disulfonate esters represented by the above formula (4) and the above formula (5) in the nonaqueous electrolytic solution or gel electrolyte is preferably 0.05 to 10% by mass based on the entire nonaqueous electrolytic solution or gel electrolyte. The proportion is more preferably 0.1 to 5% by mass or less. By setting the concentration of the above disulfonate ester at 0.05% by mass or more, a sufficient effect of the SEI can be attained. By setting the concentration to 0.1% by mass or more, the battery characteristics can be further improved. In addition, by setting the concentration of the above disulfonate ester to 10% by mass or less, Li ion conductivity in the nonaqueous electrolytic solution or gel electrolyte accompanied by an increase in resistance can be suppressed, and the battery characteristics can be further improved.

In the case of the nonaqueous electrolytic solution containing the disulfonate ester in this exemplary embodiment, the amounts of gases produced during initial charge can be reduced, and this case is also preferred in terms of safety. This is considered to be because due to the coexistence of the oxoacid ester derivative of phosphorus and the disulfonate ester in the nonaqueous electrolytic solution, an SEI taking in the oxoacid ester derivative of phosphorus can be formed by a reaction mechanism different from that in SEI formation with a nonaqueous electrolytic solution containing only a disulfonate ester.

[Group of Stacked Electrode]
(Positive Electrode Active Material)

Examples of the positive electrode active material according to this exemplary embodiment include lithium-containing complex oxides, such as $LiCoO_2$, $LiNiO_2$, and $LiMn_2O_4$. In addition, those obtained by replacing the transition metal moieties of these lithium-containing complex oxides by other elements may be used.

In addition, lithium-containing complex oxides having a plateau at a metal lithium counter electrode potential of 4.5 V or more can also be used. Examples of the lithium-containing complex oxides include spinel type lithium manganese complex oxides, olivine type lithium-containing complex oxides, and inverse spinel type lithium-containing complex oxides. Examples of the lithium-containing complex oxides include compounds represented by $Li_a(M_xMn_{2-x})O_4$ ($0<x<2$ and $0<a<1.2$; and M is at least one selected from the group consisting of Ni, Co, Fe, Cr, and Cu).

(Positive Electrode)

In the positive electrode according to this exemplary embodiment, the positive electrode layer containing the positive electrode active material is disposed on at least one surface of the positive electrode current collector. The positive electrode according to this exemplary embodiment can be made, for example, by mixing the above positive electrode active material, a conductivity-providing agent, a binding agent, and a solvent, applying the mixture to the positive electrode current collector, forming the mixture into a film, and drying and curing the mixture.

As the conductivity-providing agent, for example, powders of carbon materials, such as acetylene black, carbon black, graphite, and fibrous carbon, metal substances, such as Al, and conductive oxides can be used. One of these may be used, or two or more of these may be used in combination. As the binding agent, for example, polyvinylidene fluoride (PVDF) and fluororubbers can be used. Examples of the fluororubbers can include vinylidene fluoride-hexafluoropropylene (VDF-HFP) copolymers, vinylidene fluoride-hexafluoropropylene-tetrafluoroethylene (VDF-HFP-TFE) copolymers, vinylidene fluoride-pentafluoropropylene (VDF-PFP) copolymers, vinylidene fluoride-pentafluoropropylene-tetrafluoroethylene (VDF-PFP-TFE) copolymers, vinylidene fluoride-perfluoromethyl vinyl ether-tetrafluoroethylene (VDF-PFMVE-TFE) copolymers, ethylene-tetrafluoroethylene copolymers, and propylene-tetrafluoroethylene copolymers. In addition, fluorine-containing polymers in which hydrogen in the main chain is replaced by an alkyl group can also be used. One of these may be used, or two or more of these may be used in combination. As the positive electrode current collector, metal thin films mainly containing aluminum, aluminum alloys, and titanium, for example, can be used.

(Negative Electrode Active Material)

As the negative electrode active material according to this exemplary embodiment, for example, one or two or more substances selected from the group consisting of lithium metal, lithium alloys, and materials capable of intercalating and releasing lithium can be used. As materials capable of intercalating and releasing lithium ions, for example, carbon materials and oxides can be used.

As the carbon materials, for example, graphite, amorphous carbon, diamond-like carbon, carbon nanotubes, or complex oxides thereof, which intercalate lithium, can be used. Particularly, graphite materials have high electronic conductivity, and are excellent in adhesiveness to a current collector containing a metal, such as copper, and in voltage flatness. In addition, the graphite materials are formed at high treatment temperature, and therefore, they have low impurity content, and are advantageous in improving negative electrode performance, and therefore are preferred.

Further, composite materials of graphite materials with high crystallinity and amorphous carbon with low crystallinity can also be used.

As the oxides, for example, silicon oxide, tin oxide, indium oxide, zinc oxide, lithium oxide, phosphoric acid, boric acid, or complexes thereof can be used. Among these, particularly, silicon oxide is preferred because silicon oxide is stable and does not cause reactions with other compounds. The structure of the oxides is preferably an amorphous structure because in the amorphous structure, deterioration due to nonuniformity, such as grain boundaries and defects, is less likely to occur.

As a film formation method, methods such as a vapor deposition method, a CVD method, and a sputtering method can be used.

The lithium alloys are composed of lithium and metals capable of forming alloys with lithium. The lithium alloys are composed, for example, of binary or ternary or more alloys of metals, such as Al, Si, Pb, Sn, In, Bi, Ag, Ba, Ca, Hg, Pd, Pt, Te, Zn, and La, and lithium. The lithium metal or lithium alloys particularly preferably have an amorphous structure because by having the amorphous structure, deterioration due to nonuniformity, such as grain boundaries and defects, is less likely to occur.

The lithium metal or lithium alloys can be appropriately made by methods such as a melt cooling method, a liquid quenching method, an atomization method, a vacuum deposition method, a sputtering method, a plasma CVD method, a photo-CVD method, a thermal CVD method, and a sol-gel method.

(Negative Electrode)

In the negative electrode according to this exemplary embodiment, the negative electrode layer containing the negative electrode active material is disposed on at least one surface of the negative electrode current collector. The negative electrode according to this exemplary embodiment can be made, for example, by mixing the above negative electrode active material, a conductivity-providing agent, a binding agent, and a solvent, applying the mixture to the negative electrode current collector, forming the mixture into a film, and drying and curing the mixture.

As the conductivity-providing agent, one similar to the conductivity-providing agent in the making of the above positive electrode can be used. As the binding agent, for example, in addition to polyvinylidene fluoride (PVDF), thermoplastic resins, such as tetrafluoroethylene, polyvinylidene fluoride, polyethylene, polypropylene, an ethylene-propylene diene terpolymer (EPDM), sulfonated EPDM, styrene butadiene rubbers (SBR), the above fluororubbers, and carbomethoxycellulose, and polymers with rubber elasticity can be used. One of these may be used, or two or more of these may be used in combination. As the negative electrode current collector, for example, metal thin films mainly containing copper, nickel, and the like can be used.

(Separator)

The separator according to this exemplary embodiment is not particularly limited. Examples of the separator include microporous films and nonwoven fabrics containing polyethylene, polypropylene, polystyrene, polytetrafluoroethylene, aramid resins, and the like. In addition, the above microporous films and nonwoven fabrics containing ceramic resins can also be used.

(Configuration of Group of Stacked Electrode)

Figure 4:
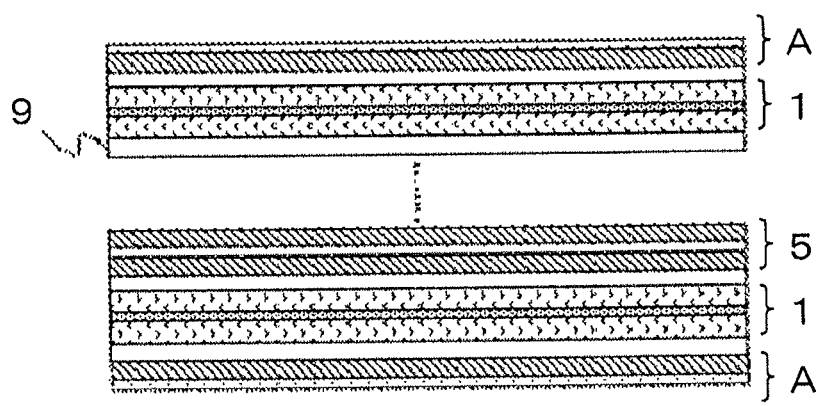
FIG. 4 is a cross-sectional view for explaining the configuration of a group of stacked electrode according to this exemplary embodiment.

In the group of stacked electrode according to this exemplary embodiment, the above positive electrodes and the above negative electrodes are alternately stacked via separators. In the group of stacked electrode according to this exemplary embodiment, for example, as shown in FIG. 4, positive electrodes 1 and negative electrodes 5 are alternately stacked via separators 9, and electrodes A are disposed on the outermost sides of the group of stacked electrode, respectively.

In this exemplary embodiment, both of the two electrodes A satisfy $0 \leq (Wc/Wb) \leq 0.55$ when the mass of the electrode active material contained in the electrode active material-coated layer B disposed on the group-of-stacked-electrodes side of the electrode current collector is Wb (g), and the mass of the electrode active material contained in the electrode active material-coated layer C disposed on the package side of the electrode current collector is Wc (g). In both of the two electrodes A disposed on the outermost sides of the group of stacked electrode, respectively, by making the amount of the electrode active material disposed on the package side smaller than the amount of the electrode active material disposed on the group-of-stacked-electrodes side of the electrode current collector, the decomposition of the oxoacid ester derivative of phosphoric acid on the electrode active materials disposed in the outermost layers is suppressed. Thus, the influence of by-products produced by the decomposition can be reduced, and good flame retardancy and cycle characteristics can be provided over a long period. Wc/Wb is preferably $0 \leq (Wc/Wb) \leq 0.5$, more preferably $0 \leq (Wc/Wb) \leq 0.4$, further preferably $0 \leq (Wc/Wb) \leq 0.3$, and particularly preferably $0 \leq (Wc/Wb) \leq 0.2$. In the electrode A shown in FIG. 4, the electrode active material-coated layer C is not disposed on the package side of the electrode current collector. In this case, Wc=0 holds, and therefore, Wc/Wb is 0. In addition, the electrode A may be a positive electrode or a negative electrode.

The electrode slurries applied for forming the electrode active material-coated layer B and electrode active material-coated layer C of the electrode A may be the same, and may not be the same. In the case where the electrode slurries are the same, the masses of the electrode active materials are also the same when the amounts of the electrode slurries applied as the electrode active material-coated layers B and C are the same. On the other hand, in the case where the electrode slurries are not the same, the masses of the electrode active materials may not be the same even if the amounts of the electrode slurries applied as the electrode active material-coated layers B and C are the same.

When the masses of the electrode active materials satisfy $0 \leq (Wc/Wb) \leq 0.55$, the electrode coated area and coating thickness of the electrode active material-coated layer C of the electrode A are arbitrary. However, the electrode coated areas of the electrode active material-coated layer C and the electrode active material-coated layer B (Sc and Sb, respectively) are preferably in the relationship of $0 \leq Sc \leq Sb$. In addition, the thicknesses of the electrode active material-coated layer C and the electrode active material-coated layer B (Tc and Tb, respectively) are preferably in the relationship of $0 \leq Tc \leq Tb$.

[Package]

The package is not particularly limited as long as it can contain the above nonaqueous electrolytic solution or the above gel electrolyte and the above group of stacked electrode. However, as the package, laminate packages are preferred, and aluminum laminate packages are more preferred.

The battery capacity of the lithium ion battery according to this exemplary embodiment is not particularly limited.

The lithium ion battery according to this exemplary embodiment can be used as a lithium ion secondary battery.

EXAMPLES

This exemplary embodiment will be described in detail below by Examples with reference to the drawings, but this exemplary embodiment is not limited to these Examples.

Example 1

A method for making a positive electrode 1 will be described by FIG. 1. N-methylpyrrolidone was added to a mixture obtained by mixing 85% by mass of $LiMn_2O_4$, 7% by mass of acetylene black as a conductive auxiliary agent, and 8% by mass of polyvinylidene fluoride as a binder, and the mixture was further mixed to make a positive electrode slurry. The positive electrode slurry was applied to both surfaces of a 20 μm thick Al foil 2, which was used as a positive electrode current collector, by a doctor blade method so that the thickness after roll pressing treatment was 160 μm, and the Al foil to which the positive electrode slurry was applied was subjected to a drying and pressing step at 120° C. for 5 minutes to form a positive electrode active material-coated portion 3. A positive electrode active material-uncoated portion 4 in which the positive electrode active material was not applied to either surface was provided at one end of the positive electrode 1.

Figure 2:
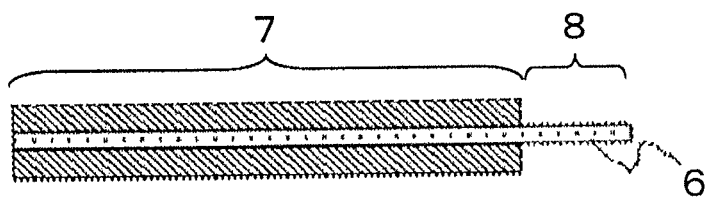
FIG. 2 is a cross-sectional view for explaining the configuration of a negative electrode according to this exemplary embodiment.

A method for making a negative electrode 5 will be described by FIG. 2. N-methylpyrrolidone was added to a mixture obtained by mixing 90% by mass of graphite, 1% by mass of acetylene black as a conductive auxiliary agent, and 9% by mass of polyvinylidene fluoride as a binder, and the mixture was further mixed to make a negative electrode slurry. The negative electrode slurry was applied to both surfaces of a 10 μm thick Cu foil 6, which was used as a negative electrode current collector, by a doctor blade method so that the thickness after roll pressing treatment was 120 μm, and the Cu foil to which the negative electrode slurry was applied was subjected to a drying and pressing step at 120° C. for 5 minutes to form a negative electrode active material-coated portion 7. A negative electrode active material-uncoated portion 8 in which the negative electrode active material was not applied to either surface was provided at one end of the negative electrode 5.

A method for making electrodes A disposed in the outermost layers, respectively, will be described by FIG. 3. In Example 1, the two electrodes A were both negative electrodes. In the electrode A, a B layer was formed on an electrode current collector E, but a C layer was not formed. Further, a negative electrode active material-uncoated portion D in which the negative electrode active material was not applied to either surface was provided at one end of the electrode A. The electrode A was made as in the method for making the above negative electrode 5 except that pressing was performed so that the thickness of the electrode A was 65 μm after roll pressing.

A method for making a group of stacked electrode will be described by FIG. 4. The above positive electrodes 1 and the above negative electrodes 2 were alternately stacked with separators 9 including a polypropylene microporous film with a film thickness of 25 μm and a porosity of 55% sandwiched therebetween. The above electrodes A were laminated on the outermost layers on both sides of this group of laminates, respectively, with separators 9 sandwiched therebetween to make a group of stacked electrode. An aluminum tab for electrode removal was attached to the positive electrode active material-uncoated portion 4 of the positive electrode 1 by welding. In addition, nickel tabs for electrode removal were attached to the negative electrode active material-uncoated portion 8 of the negative electrode 2 and the electrode active material-uncoated portion D of the electrode A, respectively, by welding. Then, the group of stacked electrode to which the tabs were attached was housed in an aluminum laminate package, and heat sealing was performed leaving one side for electrolytic solution injection.

The electrolytic solution was made by blending a solvent (ethylene carbonate (EC)/diethyl carbonate (DEC)=30/70 (volume ratio)), 20% by mass of tri(trifluoroethyl) phosphate, 2% by mass of the compound No. 2 in Table 1, and 1.2 mol/L of $LiPF_6$ as a supporting salt. The above electrolytic solution was injected from the above one side for electrolytic solution injection to perform vacuum impregnation, and the injection portion was heat-sealed to obtain a battery.

Discharge capacity when the obtained battery was CC-CV charged (upper limit voltage 4.2 V, current 0.2 C, CV time 1.5 hours) and then CC discharged (lower limit voltage 3.0 V, current 0.2 C) was taken as initial capacity.

The cycle test of the obtained battery was CC-CV charge (upper limit voltage 4.2 V, current 1 C, CV time 1.5 hours) and CC discharge (lower limit voltage 3.0 V, current 1 C), and both were carried out at 45° C. The capacity retention rate after 1000 cycles was the proportion of discharge capacity at the 1000th cycle to discharge capacity at the 1st cycle. The evaluation result is shown in Table 3.

The rate characteristics were the proportion of 2 C capacity to 0.2 C capacity at 20° C. The evaluation results of initial rate characteristics and rate characteristics after 1000 cycles are shown in Table 3.

The combustion test was performed by placing the battery after the above cycle test 10 cm above the tip of the flame of a gas burner. Combustibility was evaluated from a state in which the solvent of the electrolytic solution volatilized and combusted, as follows. A case where the electrolytic solution was not ignited was taken as "A." A case where even if ignition occurred, the fire extinguished after 2 to 3 seconds was taken as "B." A case where even if ignition occurred, the fire extinguished within 10 seconds was taken as "C." A case where combustion continued without fire extinction for more than 10 seconds was taken as "D."

Example 2

A battery was made and evaluation was performed as in Example 1 except that the same negative electrode slurry as the B layer was applied as the C layer in an amount 1/10 of the amount of the B layer applied so that the Wc/Wb of both of the two electrodes A was 0.1, and pressing was performed so that the thickness of the electrode A was 71 μm.

Example 3

A battery was made and evaluation was performed as in Example 1 except that the same negative electrode slurry as the B layer was applied as the C layer in an amount 1/5 of the amount of the B layer applied so that the Wc/Wb of both of the two electrodes A was 0.2, and pressing was performed so that the thickness of the electrode A was 76 μm.

Example 4

A battery was made and evaluation was performed as in Example 1 except that the same negative electrode slurry as the B layer was applied as the C layer in an amount 3/10 of the amount of the B layer applied so that the Wc/Wb of both of the two electrodes A was 0.3, and pressing was performed so that the thickness of the electrode A was 82 μm.

Example 5

A battery was made and evaluation was performed as in Example 1 except that the same negative electrode slurry as the B layer was applied as the C layer in an amount 1/2 of the amount of the B layer so that the Wc/Wb of both of the two electrodes A was 0.5, and pressing was performed so that the thickness of the electrode A was 93 μm.

Example 6

A battery was made and evaluation was performed as in Example 1 except that the same negative electrode slurry as the B layer was applied as the C layer in an amount 11/20 of the amount of the B layer applied so that the Wc/Wb of both of the two electrodes A was 0.55, and pressing was performed so that the thickness of the electrode A was 95 μm.

Example 7

A battery was made and evaluation was performed as in Example 1 except that as the negative electrode active material, amorphous carbon was used instead of graphite, the C layers of both of the two electrodes A were not applied, and pressing was performed so that the thickness of the electrode A was 75 μm.

Example 8

A battery was made and evaluation was performed as in Example 7 except that the same negative electrode slurry as the B layer was applied as the C layer in an amount 11/20 of the amount of the B layer applied so that the Wc/Wb of both of the two electrodes A was 0.55, and pressing was performed so that the thickness of the electrode A was 111 μm.

Example 9

A battery was made and evaluation was performed as in Example 1 except that the electrolytic solution was a gel electrolyte. The battery was made by the following method. In addition to the components of the electrolytic solution in Example 1, 3.8% by mass of triethylene glycol diacrylate and 1% by mass of trimethylolpropane triacrylate as gelling agents, which were polymer components, were blended, and mixed well. 0.5% by mass of t-butyl peroxypivalate as a polymerization initiator was further blended to the mixture to make a pre-gel solution. The pre-gel solution was injected from the above one side for electrolytic solution injection to perform vacuum impregnation, the injection portion was heat-sealed, and polymerization was performed at 80° C. for 2 hours to obtain the battery.

Comparative Example 1

A battery was made and evaluation was performed as in Example 1 except that the same negative electrode slurry as the B layer was applied as the C layer in an amount 6/10 of the amount of the B layer applied so that the Wc/Wb of both of the two electrodes A was 0.6, and pressing was performed so that the thickness of the electrode A was 98 μm.

Comparative Example 2

A battery was made and evaluation was performed as in Example 1 except that the Wc/Wb of both of the two electrodes A was 1, that is, the negative electrode 5 was used for both of the two electrodes A.

Comparative Example 3

A battery was made and evaluation was performed as in Comparative Example 1 except that as the negative electrode active material, amorphous carbon was used instead of graphite, and pressing was performed so that the thickness of the electrode A was 114 μm.

Comparative Example 4

A battery was made and evaluation was performed as in Comparative Example 2 except that as the negative electrode active material, amorphous carbon was used instead of graphite, and pressing was performed so that the thickness of the electrode A was 140 μm.

Comparative Example 5

Operation was performed as in Comparative Example 2 except that the electrolytic solution was a gel electrolyte. The battery including the gel electrolyte was made as in Example 9.

istics when Wc/Wb was 0 (Example 1) to 0.55 (Example 6), the proportion of the decrease in characteristics when Wc/Wb was 0.6 (Comparative Example 1) was very large. Therefore, it was found that since a certain amount or more of the electrode active material was present in the C layers in the outermost layers of the group of stacked electrode, the capacity retention rate and the rate characteristics decreased greatly. In addition, from Examples 7 and 8 and Comparative Examples 3 and 4, it was found that there was a similar tendency also when amorphous carbon was used as the negative electrode active material. Further, from Example 9 and Comparative Example 5, it was found that there was a similar tendency also when the electrolytic solution was a gel electrolytic solution.

In Comparative Example 1, the flame retardancy was "B," and the cell characteristics decreased greatly, and therefore, in Comparative Example 1, both the cell characteristics and the flame retardancy could not be achieved. On the other hand, in Examples 1 to 5, the cell characteristics were good, and the flame retardancy was "A," and in Example 6, the cell characteristics were good, and the flame retardancy was "B," and both the cell characteristics and the flame retardancy were achieved. In addition, also in the case where the negative electrode active material was amorphous carbon, and in the case of the gel electrolyte, similar results were obtained. The results are considered due to suppressed decomposition of tri(trifluoroethyl) phosphate in the C layer in Examples 1 to 9.

TABLE 3

| | Wc/Wb | Electrode A/ electrolytic solution | Capacity retention rate after 1000 cycles (%) | Initial rate characteristics (%) | Rate characteristics after 1000 cycles (%) | Combustibility |
|---|---|---|---|---|---|---|
| Example 1 | 0 | Negative electrode (graphite)/liquid | 78 | 75 | 68 | A |
| Example 2 | 0.1 | Negative electrode (graphite)/liquid | 77 | 74 | 66 | A |
| Example 3 | 0.2 | Negative electrode (graphite)/liquid | 74 | 75 | 67 | A |
| Example 4 | 0.3 | Negative electrode (graphite)/liquid | 75 | 76 | 61 | A |
| Example 5 | 0.5 | Negative electrode (graphite)/liquid | 69 | 75 | 54 | A |
| Example 6 | 0.55 | Negative electrode (graphite)/liquid | 64 | 75 | 51 | B |
| Example 7 | 0 | Negative electrode (amorphous carbon)/liquid | 83 | 89 | 81 | A |
| Example 8 | 0.55 | Negative electrode (amorphous carbon)/liquid | 78 | 89 | 75 | A |
| Example 9 | 0 | Negative electrode (graphite)/gel | 54 | 72 | 61 | B |
| Comparative Example 1 | 0.6 | Negative electrode (graphite)/liquid | 46 | 73 | 34 | B |
| Comparative Example 2 | 1 | Negative electrode (graphite)/liquid | 24 | 74 | 30 | C |
| Comparative Example 3 | 0.6 | Negative electrode (amorphous carbon)/liquid | 55 | 88 | 51 | B |
| Comparative Example 4 | 1 | Negative electrode (amorphous carbon)/liquid | 47 | 87 | 48 | C |
| Comparative Example 5 | 1 | Negative electrode (graphite)/gel | 28 | 71 | 31 | C |

As shown in Examples 1 to 6 and Comparative Examples 1 and 2, it is found that as the Wc/Wb of both of the two electrodes A in the outermost layers increases, a decrease in capacity retention rate and rate characteristics after cycles occurs. However, with respect to the decrease in character-

Example 10

Both of the two electrodes A were positive electrodes, aluminum tabs for electrode removal were welded to the positive electrode active material-uncoated portion 4 of the positive electrode 1 and the electrode active material-uncoated portion D of the electrode A, respectively, and pressing was performed so that the thickness of the electrode A was 90 μm after roll pressing. For others, the electrode A was made as in the method for making the positive electrode 1 in Example 1. Except these, a battery was made and evaluation was performed as in Example 1.

Example 11

A battery was made and evaluation was performed as in Example 10 except that the positive electrode slurry was applied as the C layer in an amount $11/20$ of the amount of the B layer applied so that the Wc/Wb of both of the two electrodes A was 0.55, and pressing was performed so that the thickness of the electrode A was 129 μm.

Example 12

A battery was made and evaluation was performed as in Example 10 except that $LiCoO_2$ was used for the positive electrode active material of the positive electrode 1, and pressing was performed so that the thickness of the electrode A was 80 μm.

Comparative Example 6

A battery was made and evaluation was performed as in Example 10 except that the positive electrode slurry was applied as the C layer in an amount $6/10$ of the amount of the B layer applied so that the Wc/Wb of both of the two electrodes A was 0.6, and pressing was performed so that the thickness of the electrode A was 132 μm.

Comparative Example 7

A battery was made and evaluation was performed as in Example 10 except that the Wc/Wb of both of the two electrodes A was 1, that is, the positive electrode 1 was used for both of the two electrodes A.

Comparative Example 8

A battery was made and evaluation was performed as in Example 10 except that $LiCoO_2$ was used for the positive electrode active material of the positive electrode 1, the Wc/Wb of both of the two electrodes A was 1, that is, the positive electrode 1 was used for both of the two electrodes A, and pressing was performed so that the thickness of the electrode A was 140 μm.

As shown in Examples 10 to 12 and Comparative Examples 6 to 8, it is found that also in the case where the positive electrodes were disposed in the outermost layers, as the Wc/Wb of both of the two electrodes A in the outermost layers increases, a decrease in capacity retention rate and rate characteristics after cycles occurs. However, as in the negative electrodes, with respect to the decrease in characteristics when Wc/Wb was 0 to 0.55, the proportion of the decrease in characteristics when Wc/Wb was 0.6 was very large, and since a certain amount or more of the electrode active material was present in the C layers in the outermost layers of the group of stacked electrode, the capacity retention rate and the rate characteristics decreased greatly.

Example 13

A battery was made and evaluation was performed as in Example 1 except that di(trifluoroethyl) fluorophosphonate was used as the oxoacid ester derivative of phosphoric acid.

Example 14

A battery was made and evaluation was performed as in Example 1 except that trifluoroethyl difluorophosphinate was used as the oxoacid ester derivative of phosphoric acid.

Example 15

A battery was made and evaluation was performed as in Example 1 except that methyl di(trifluoroethyl) phosphate was used as the oxoacid ester derivative of phosphoric acid.

Example 16

A battery was made and evaluation was performed as in Example 1 except that trifluoropropyl di(trifluoroethyl) phosphate was used as the oxoacid ester derivative of phosphoric acid.

Example 17

A battery was made and evaluation was performed as in Example 1 except that methyl fluoroethyl fluorophosphonate was used as the oxoacid ester derivative of phosphoric acid.

Example 18

A battery was made and evaluation was performed as in Example 1 except that fluoroethyl fluoropropyl fluorophosphonate was used as the oxoacid ester derivative of phosphoric acid.

TABLE 4

| | Wc/Wb | Electrode A/ electrolytic solution | Capacity retention rate after 1000 cycles (%) | Initial rate characteristics (%) | Rate characteristics after 1000 cycles (%) | Combustibility |
|---|---|---|---|---|---|---|
| Example 10 | 0 | Positive electrode (Mn)/liquid | 79 | 73 | 65 | A |
| Example 11 | 0.55 | Positive electrode (Mn)/liquid | 62 | 71 | 64 | A |
| Example 12 | 0 | Positive electrode (Co)/liquid | 77 | 73 | 61 | A |
| Comparative Example 6 | 0.6 | Positive electrode (Mn)/liquid | 49 | 70 | 58 | B |
| Comparative Example 7 | 1 | Positive electrode (Mn)/liquid | 22 | 71 | 35 | C |
| Comparative Example 8 | 1 | Positive electrode (Co)/liquid | 31 | 70 | 37 | C |

Example 19

A battery was made and evaluation was performed as in Example 1 except that fluoropropyl difluorophosphinate was used as the oxoacid ester derivative of phosphoric acid.

Example 20

A battery was made and evaluation was performed as in Example 1 except that 10% by mass of tri(trifluoroethyl) phosphate was mixed.

Example 21

A battery was made and evaluation was performed as in Example 1 except that 40% by mass of tri(trifluoroethyl) phosphate was mixed.

Example 22

A battery was made and evaluation was performed as in Example 1 except that 60% by mass of tri(trifluoroethyl) phosphate was mixed.

TABLE 5

|  | Wc/Wb | Oxoacid ester derivative of phosphorus | Content (% by mass) | Capacity retention rate after 1000 cycles (%) | Initial rate characteristics (%) | Rate characteristics after 1000 cycles (%) | Combustibility |
|---|---|---|---|---|---|---|---|
| Example 1 | 0 | Tri(trifluoroethyl) phosphate | 20 | 78 | 75 | 68 | A |
| Example 13 | 0 | Di(trifluoroethyl) fluorophosphonate | 20 | 71 | 74 | 65 | A |
| Example 14 | 0 | Trifluoroethyl difluorophosphinate | 20 | 73 | 75 | 66 | A |
| Example 15 | 0 | Methyl di(trifluoroethyl) phosphate | 20 | 74 | 76 | 67 | A |
| Example 16 | 0 | Trifluoropropyl di(trifluoroethyl) phosphate | 20 | 79 | 72 | 65 | A |
| Example 17 | 0 | Methyl fluoroethyl fluorophosphonate | 20 | 66 | 73 | 66 | A |
| Example 18 | 0 | Fluoroethyl fluoropropyl fluorophosphonate | 20 | 68 | 69 | 64 | A |
| Example 19 | 0 | Fluoropropyl difluorophosphinate | 20 | 68 | 66 | 61 | A |
| Example 20 | 0 | Tri(trifluoroethyl) phosphate | 10 | 84 | 78 | 72 | B |
| Example 21 | 0 | Tri(trifluoroethyl) phosphate | 40 | 73 | 68 | 61 | A |
| Example 22 | 0 | Tri(trifluoroethyl) phosphate | 60 | 72 | 64 | 58 | A |

From Examples 1 and 13 to 19, it was found that regardless of the structure of the oxoacid ester derivative of phosphorus, similar effects were provided. In addition, from Examples 1 and 20 to 22, it was found that when the content of the oxoacid ester derivative of phosphorus was 10 to 60% by mass, both the flame retardancy and the cell characteristics were achieved. In other words, when the content of the oxoacid ester derivative of phosphorus is 5% by mass or more, a combustion suppression effect on the electrolytic solution can be more effectively attained, and when the content of the oxoacid ester derivative of phosphorus is 10% by mass or more, the combustion suppression effect is further enhanced. In addition, when the content of the oxoacid ester derivative of phosphorus is 60% by mass or less, the battery characteristics are improved by the suppression of an increase in resistance, and it is easy to also provide the reductive decomposition suppression effect by the addition of a disulfonate ester more effectively, and it is easy to ensure the combustion suppression effect over a long period.

Example 23

Figure 5:
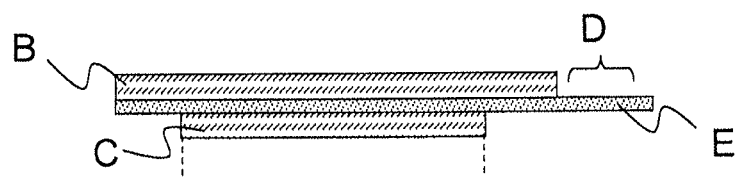
FIG. 5 shows a cross-sectional view (a) and bottom view (b) for explaining the configuration of an electrode A disposed in an outermost layer of a group of stacked electrode according to this exemplary embodiment (the coated areas of a B layer and a C layer are not the same).
Figure 5:
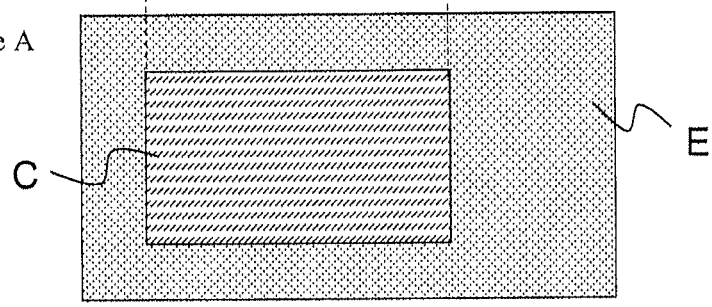

A battery was made and evaluation was performed as in Example 6 except that as shown in FIG. 5, for the C layer and B layer of the electrode A, the same negative electrode slurry was applied so that the coating thickness was the same and the coated area Sc/Sb was 0.55 (therefore, Wc/Wb was 0.55, the same as Example 6).

TABLE 6

Figure 3:
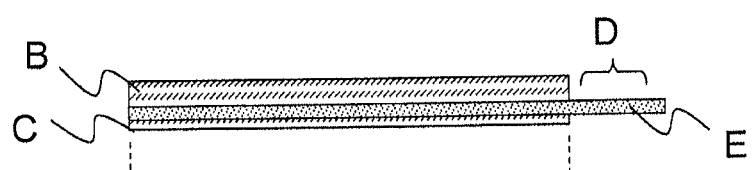
FIG. 3 shows a cross-sectional view (a) and bottom view (b) for explaining the configuration of an electrode A disposed in an outermost layer of a group of stacked electrode according to this exemplary embodiment (the coated areas of a B layer and a C layer are the same).
Figure 3:
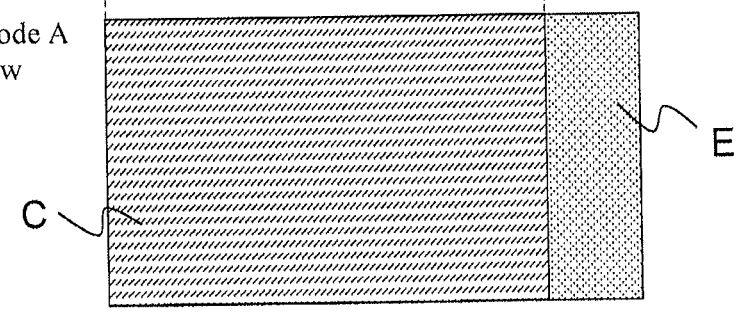

| | Wc/Wb | Electrode A | Capacity retention rate after 1000 cycles (%) | Initial rate characteristics (%) | Rate characteristics after 1000 cycles (%) | Combustibility |
|---|---|---|---|---|---|---|
| Example 6 | 0.55 | FIG. 3 | 64 | 75 | 51 | A |
| Example 23 | 0.55 (Sc/Sb) | FIG. 5 | 72 | 72 | 64 | A |

From Example 23, it was found that regardless of the coating form of the C layer of the electrode A, similar effects were provided.

Example 24

A battery was made and evaluation was performed as in Example 1 except that instead of 2% by mass of the compound No. 2 in Table 1, 3% by mass of 1,3-propane sultone (PS) was mixed in the electrolytic solution.

Comparative Example 9

A battery was made and evaluation was performed as in Example 24 except that the Wc/Wb of the electrode A was 1, that is, the electrode A was the negative electrode 5.

5: a negative electrode
6: Cu foil
7: a negative electrode active material-double coated portion
8: a negative electrode active material-uncoated portion
9: a separator
A: an electrode disposed in an outermost layer of a group of stacked electrode
B: an electrode active material-coated layer disposed on the group-of-stacked-electrodes side of an electrode current collector
C: an electrode active material-coated layer disposed on the package side of the electrode current collector
D: an electrode active material-uncoated portion
E: an electrode current collector

TABLE 7

| | Wc/Wb | Additive | Capacity retention rate after 1000 cycles (%) | Initial rate characteristics (%) | Rate characteristics after 1000 cycles (%) | Combustibility |
|---|---|---|---|---|---|---|
| Example 24 | 0 | PS | 54 | 71 | 58 | C |
| Comparative Example 9 | 1 | PS | 21 | 70 | 37 | D |

From Example 24 and Comparative Example 9, it was found that also when the additive was PS, similar effects were obtained.

From the above, according to this exemplary embodiment, a battery having flame retardancy and good cycle characteristics on a long-term basis can be obtained.

This application claims priority to Japanese Patent Application No. 2011-46774 filed Mar. 3, 2011, the entire disclosure of which is incorporated herein.

While the invention of this application has been described with reference to the exemplary embodiment and the Examples, the invention of this application is not limited to the above exemplary embodiment and Examples. Various changes that can be understood by those skilled in the art can be made in the configuration and details of the invention of this application within the scope of the invention of this application.

INDUSTRIAL APPLICABILITY

The lithium ion battery according to this exemplary embodiment can be used for, in addition to secondary batteries, energy storage devices, such as electric double layer capacitors and lithium ion capacitors, and the like.

REFERENCE SIGNS LIST

1: a positive electrode
2: Al foil
3: a positive electrode active material-double coated portion
4: a positive electrode active material-uncoated portion

The invention claimed is:
1. A lithium on battery comprising: a nonaqueous electrolytic solution or gel electrolyte comprising at least a Li salt and at least one oxoacid ester derivative of phosphoric acid selected from the following group (2)
a group of stacked electrode in which positive electrodes comprising a positive electrode layer comprising a positive electrode active material disposed on at least one surface of a positive electrode current collector, and negative electrodes comprising a negative electrode layer comprising a negative electrode active material disposed on at least one surface of a negative electrode current collector are alternately stacked via separators; and
a package comprising the nonaqueous electrolytic solution or the del electrolyte and the group of stacked electrode, wherein
both of two electrodes A disposed on outermost sides of the group of stacked electrode, respectively, satisfy 0<(Wc/Wb)≤0.55 when a mass of an electrode active material comprised in an electrode active material-coated layer B disposed on a group-of-stacked-electrodes side of the electrode current collector is Wb (g), and a mass of an electrode active material comprised in an electrode active material-coated layer C disposed on a package side of the electrode current collector is Wc (g), and
the oxoacid ester derivative of phosphoric acid selected from the group (2) is a compound selected from the group consisting of methyl ethyl fluorophosphonate, methyl propyl fluorophosphonate, methyl butyl fluorophosphonate, ethyl methyl fluorophosphonate, propyl methyl fluorophosphonate, butyl methyl fluorophosphonate, ethyl propyl fluorophosphonate, ethyl butyl fluorophosphonate, propyl butyl fluorophosphonate, methyl trifluoroethyl fluorophosphonate, ethyl trifluoroethyl fluorophosphonate, propyl trifluoroethyl fluorophosphonate, di(pentafluoropropyl) fluorophosphonate, methyl pentafluoropropyl fluorophosphonate, ethyl pentafluoropropyl fluorophosphonate; butyl pentafluoropropyl fluorophosphonate, ethyl fluorophenyl fluorophosphonate, methyl fluoroethylene fluorophosphonate, and fluoroethyl fluoropropyl fluorophosphonate.

2. The lithium on battery according to claim 1, wherein both of the two electrodes A satisfy 0<(Wc/Wb)≤0.03.

3. The lithium ion battery according to claim 1, wherein the nonaqueous electrolytic solution or the gel electrolyte comprises 5 to 60% by mass of the oxoacid ester derivative of phosphoric acid.

4. The lithium ion battery according to claim 1, wherein the nonaqueous electrolytic solution or the gel electrolyte further comprises at least one of disulfonate esters represented by the following formulas (4) and (5):

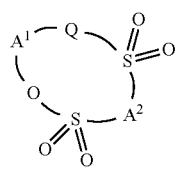

(4)

wherein Q represents an oxygen atom, a methylene group, or a single bond; $A^1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which comprises an ether bond and may be branched, a substituted or unsubstituted perfluoroalkylene group having 1 to 6 carbon atoms which comprises an ether bond and may be branched, or a substituted or unsubstituted fluoroalkylene group having 2 to 6 carbon atoms which comprises an ether bond and may be branched; and $A^2$ represents a substituted or unsubstituted alkylene group, a substituted or unsubstituted fluoroalkylene group, or an oxygen atom,

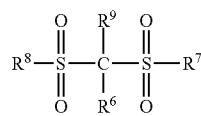

(5)

wherein $R^6$ and $R^9$ each independently represent an atom or group selected from the group consisting of a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_3$, where $X_3$ is a substituted or unsubstituted alkyl group having 1 to 5 carbon atoms, —$SY_1$, where $Y_1$ is a substituted or unsubstituted alkyl group having 1 to 5 carbon atoms, —COZ, where Z is a hydrogen atom or a substituted or unsubstituted alkyl group having 1 to 5 carbon atoms, and a halogen atom; and $R^7$ and $R^8$ each independently represent an atom or group selected from the group consisting of a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_4X_5$, where $X_4$ and $X_5$ are each independently a hydrogen atom or a substituted or unsubstituted alkyl group having 1 to 5 carbon atoms, and —$NY_2CONY_3Y_4$, where $Y_2$ to $Y_4$ are each independently a hydrogen atom or a substituted or unsubstituted alkyl group having 1 to 5 carbon atoms.

5. The lithium ion battery according to claim 1, wherein the package is a laminate package.

6. The lithium ion battery according to claim 2, wherein the nonaqueous electrolytic solution or the gel electrolyte comprises 5 to 60% by mass of the oxoacid ester derivative of phosphoric acid.

7. The lithium ion battery according to claim 2, wherein the nonaqueous electrolytic solution or the gel electrolyte further comprises at least one of disulfonate esters represented by the following formulas (4) and (5):

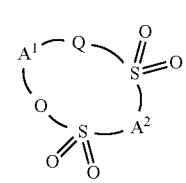

(4)

wherein Q represents an oxygen atom, a methylene group, or a single bond; $A^1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which comprises an ether bond and may be branched, a substituted or unsubstituted perfluoroalkylene group having 1 to 6 carbon atoms which comprises an ether bond and may be branched, or a substituted or unsubstituted fluoroalkylene group having 2 to 6 carbon atoms which comprises an ether bond and may be branched; and $A^2$ represents a substituted or unsubstituted alkylene group, a substituted or unsubstituted fluoroalkylene group, or an oxygen atom,

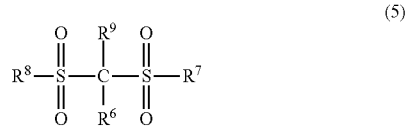

(5)

wherein $R^6$ and $R^9$ each independently represent an atom or group selected from the group consisting of a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_3$, where $X_3$ is a substituted or unsubstituted alkyl group having 1 to 5 carbon atoms, —$SY_1$, where $Y_1$ is a substituted or unsubstituted alkyl group having 1 to 5 carbon atoms, —COZ, where Z is a hydrogen atom or a substituted or unsubstituted alkyl group having 1 to 5 carbon atoms, and a halogen atom; and $R^7$ and $R^8$ each independently represent an atom or group selected from the group consisting of a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_4X_5$, where $X_4$ and $X_5$ are each independently a hydrogen atom or a substituted or unsubstituted alkyl group having 1 to 5 carbon atoms, and —$NY_2CONY_3Y_4$, where $Y_2$ to $Y_4$ are each independently a hydrogen atom or a substituted or unsubstituted alkyl group having 1 to 5 carbon atoms.

8. The lithium ion battery according to claim 3, wherein the nonaqueous electrolytic solution or the gel electrolyte further comprises at least one of disulfonate esters represented by the following formulas (4) and (5):

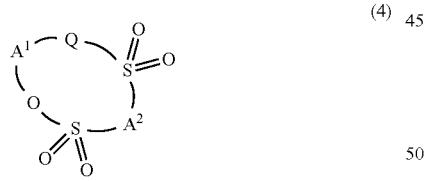

(4)

wherein Q represents an oxygen atom, a methylene group, or a single bond; $A^1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which comprises an ether bond and may be branched, a substituted or unsubstituted perfluoroalkylene group having 1 to 6 carbon atoms which comprises an ether bond and may be branched, or a substituted or unsubstituted fluoroalkylene group having 2 to 6 carbon atoms which comprises an ether bond and may be branched; and $A^2$ represents a substituted or unsubstituted alkylene group, a substituted or unsubstituted fluoroalkylene group, or an oxygen atom,

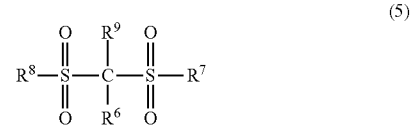

(5)

wherein $R^6$ and $R^9$ each independently represent an atom or group selected from the group consisting of a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_3$, where $X_3$ is a substituted or unsubstituted alkyl group having 1 to 5 carbon atoms, —$SY_1$, where $Y_1$ is a substituted or unsubstituted alkyl group having 1 to 5 carbon atoms, —COZ, where Z is a hydrogen atom or a substituted or unsubstituted alkyl group having 1 to 5 carbon atoms, and a halogen atom; and $R^7$ and $R^8$ each independently represent an atom or group selected from the group consisting of a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_4X_5$, where $X_4$ and $X_5$ are each independently a hydrogen atom or a substituted or unsubstituted alkyl group having 1 to 5 carbon atoms, and —$NY_2CONY_3Y_4$, where $Y_2$ to $Y_4$ are each independently a hydrogen atom or a substituted or unsubstituted alkyl group having 1 to 5 carbon atoms.

9. The lithium ion battery according to claim 6, wherein the nonaqueous electrolytic solution or the gel electrolyte further comprises at least one of disulfonate esters represented by the following formulas (4) and (5):

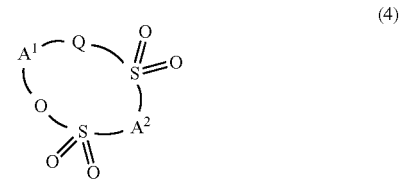

(4)

wherein Q represents an oxygen atom, a methylene group, or a single bond; $A^1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which comprises an ether bond and may be branched, a substituted or unsubstituted perfluoroalkylene group having 1 to 6 carbon atoms which comprises an ether bond and may be branched, or a substituted or unsubstituted fluoroalkylene group having 2 to 6 carbon atoms which comprises an ether bond and may be branched; and $A^2$ represents a substituted or unsubstituted alkylene group, a substituted or unsubstituted fluoroalkylene group, or an oxygen atom,

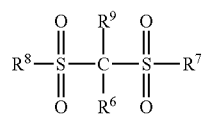

(5)

wherein $R^6$ and $R^9$ each independently represent an atom or group selected from the group consisting of a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X_3$, where $X_3$ is a substituted or unsubstituted alkyl group having 1 to 5 carbon atoms, $-SY_1$, where $Y_1$ is a substituted or unsubstituted alkyl group having 1 to 5 carbon atoms, $-COZ$, where $Z$ is a hydrogen atom or a substituted or unsubstituted alkyl group having 1 to 5 carbon atoms, and a halogen atom; and $R^7$ and $R^8$ each independently represent an atom or group selected from the group consisting of a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $-NX_4X_5$, where $X_4$ and $X_5$ are each independently a hydrogen atom or a substituted or unsubstituted alkyl group having 1 to 5 carbon atoms, and $-NY_2CONY_3Y_4$, where $Y_2$ to $Y_4$ are each independently a hydrogen atom or a substituted or unsubstituted alkyl group having 1 to 5 carbon atoms.

\* \* \* \* \*

UNITED STATES PATENT AND TRADEMARK OFFICE
CERTIFICATE OF CORRECTION

PATENT NO. : 9,620,812 B2
APPLICATION NO. : 13/977842
DATED : April 11, 2017
INVENTOR(S) : Shinako Kaneko and Hitoshi Ishikawa Page 1 of 1

It is certified that error appears in the above-identified patent and that said Letters Patent is hereby corrected as shown below:

In the Claims

Claim 1, Column 28, Line 38:
"on" has been replaced with --ion--

Claim 1, Column 28, Line 51:
"del" has been replaced with --gel--

Claim 1, Column 29, Line 8:
"fluorophosphonate;" has been replaced with --fluorophosphonate,--

Claim 2, Column 29, Line 13:
"on" has been replaced with --ion--

Signed and Sealed this
Twelfth Day of June, 2018

Andrei Iancu
*Director of the United States Patent and Trademark Office*